(12) United States Patent
Ichimura

(10) Patent No.: US 8,587,718 B2
(45) Date of Patent: Nov. 19, 2013

(54) IMAGE PICKUP UNIT AND MANUFACTURING METHOD OF IMAGE PICKUP UNIT

(75) Inventor: Hironobu Ichimura, Akishima (JP)

(73) Assignee: Olympus Medical Systems Corp., Tokyo (JP)

( * ) Notice: Subject to any disclaimer, the term of this patent is extended or adjusted under 35 U.S.C. 154(b) by 539 days.

(21) Appl. No.: 12/100,642

(22) Filed: Apr. 10, 2008

(65) Prior Publication Data

US 2008/0266441 A1    Oct. 30, 2008

(30) Foreign Application Priority Data

Apr. 26, 2007  (JP) ................... 2007-117531

(51) Int. Cl.
*H04N 5/225* (2006.01)
*H01L 21/00* (2006.01)

(52) U.S. Cl.
USPC ............................................ 348/375; 438/64

(58) Field of Classification Search
USPC .............. 348/335, 340, 372–375; 359/619; 257/294, 432, 680; 438/64–67
See application file for complete search history.

(56) References Cited

U.S. PATENT DOCUMENTS

| | | | | |
|---|---|---|---|---|
| 5,400,108 | A * | 3/1995 | Komatsu ................... | 396/541 |
| 7,528,880 | B2 * | 5/2009 | Yamaguchi et al. ......... | 348/335 |
| 7,535,509 | B2 * | 5/2009 | Takayama .................. | 348/340 |
| 2001/0010562 | A1 * | 8/2001 | Nakagishi et al. ......... | 348/374 |
| 2004/0125227 | A1 | 7/2004 | Tsuruoka et al. | |
| 2005/0001219 | A1 * | 1/2005 | Minamio et al. ............. | 257/79 |
| 2006/0027740 | A1 * | 2/2006 | Glenn et al. ............... | 250/239 |
| 2006/0220232 | A1 * | 10/2006 | Tanida et al. .............. | 257/723 |
| 2007/0280678 | A1 * | 12/2007 | Chien et al. ................ | 396/529 |
| 2007/0295893 | A1 * | 12/2007 | Olsen et al. ................ | 250/226 |

FOREIGN PATENT DOCUMENTS

| | | |
|---|---|---|
| EP | 1 289 281 A1 | 3/2003 |
| EP | 1 351 496 A2 | 10/2003 |
| EP | 1 408 556 A2 | 4/2004 |
| JP | 62-179281 A | 8/1987 |
| JP | 2002-247427 A | 8/2002 |
| JP | 2003-289457 A | 10/2003 |
| JP | 2005-109092 | 4/2005 |
| JP | 2006-067604 A | 3/2006 |
| WO | WO 2004/112593 A1 | 12/2004 |

OTHER PUBLICATIONS

European Search Report, dated Mar. 24, 2011, from the European Patent Office in counterpart European Patent Application No. 08007512.0.
Japanese Office Action, dated Jan. 31, 2012, issued in counterpart Japanese Patent Application No. 2007-117531.

* cited by examiner

*Primary Examiner* — Lin Ye
*Assistant Examiner* — Akshay Trehan
(74) *Attorney, Agent, or Firm* — Scully, Scott, Murphy & Presser, P.C.

(57) ABSTRACT

An image pickup unit according the present invention includes: a solid-state image pickup device which photoelectrically converts a photographic light and thereby outputs a video signal; and a lens barrel which, being approximately cylindrical in shape and being fastened to the solid-state image pickup device by a light-curing adhesive, holds a plurality of objective lenses, wherein a tapered surface is formed on a rear end face which opposes front part of the solid-state image pickup device of the lens barrel, with distance between the tapered surface and the front part of the solid-state image pickup device increasing toward outer circumference.

4 Claims, 14 Drawing Sheets

IMAGE PICKUP UNIT AND MANUFACTURING METHOD OF IMAGE PICKUP UNIT

This application claims benefit of Japanese Patent Application No. 2007-117531 filed in Japan on Apr. 26, 2007, the contents of which are incorporated by this reference.

BACKGROUND OF THE INVENTION

1. Field of the Invention

The present invention relates to an image pickup unit equipped with a small image pickup device as well as to a manufacturing method of the image pickup unit.

2. Description of the Related Art

Recently, photographic apparatuses equipped with a built-in image pickup unit including a solid-state image pickup device such as CCD have been widely used. Such photographic apparatus include photographic cameras and video cameras. Among apparatuses which acquire still images, moving images, and the like for various purposes using a photographic apparatus, for example, industrial electronic endoscopes and medical electronic endoscopes are widely used.

Medical endoscopes, in particular, allow surgeons to observe lesions by inserting an insertion portion deep into a body or carry out inspection and treatment in the body by using treatment instruments in conjunction as required. Medical electronic endoscopes are expected to be downsized as much as possible to alleviate patients' pain when a distal end portion of the insertion portion is inserted. The image pickup unit incorporated in the distal end portion of the electronic endoscopes thus downsized is expected to be downsized as well.

For example, Japanese Patent Application Laid-Open Publication No. 2005-109092 discloses an image pickup apparatus in which a solid-state image pickup device is packaged for downsizing. In order not to increase manufacturing processes, the image pickup apparatus is configured such that an objective lens is urged against the solid-state image pickup device by a compression coil spring with the apparatus kept thin instead of fixedly bonding the solid-state image pickup device and an objective lens.

SUMMARY OF THE INVENTION

An image pickup unit of the present invention includes: a solid-state image pickup device which photoelectrically converts a photographic light and thereby outputs a video signal; and a lens barrel which, being approximately cylindrical in shape and being fastened to the solid-state image pickup device by a light-curing adhesive, holds a plurality of objective lenses, wherein the lens barrel has a tapered surface on a rear end face which opposes front part of the solid-state image pickup device, with distance between the tapered surface and the front part of the solid-state image pickup device increasing toward outer circumference.

The present invention provides a manufacturing method for an image pickup unit which includes a solid-state image pickup device, an objective lens which has a plurality of legs extending toward the solid-state image pickup device, and a lens barrel which holds the objective lens and has a tapered surface on a rear end face which opposes front part of the solid-state image pickup device, with distance between the tapered surface and the front part of the solid-state image pickup device increasing toward outer circumference, the manufacturing method comprising the steps of: applying a light-curing adhesive to an end face of each of the plurality of legs of the objective lens which opposes the solid-state image pickup device; mounting the objective lens together with the lens barrel by abutting the end face of each of the plurality of legs of the objective lens against the solid-state image pickup device; and directing a beam at the end face of each of the plurality of legs in a direction along the tapered surface to cure the light-curing adhesive.

The above and other objects, features and advantages of the invention will become more clearly understood from the following description referring to the accompanying drawings.

DETAILED DESCRIPTION OF THE PREFERRED EMBODIMENTS

Embodiments of the present invention will be described below with reference to the drawings. The description will be provided by taking an electronic endoscope as an example.
(First Embodiment)

To begin with, a first embodiment of the present invention will be described below.

Figure 1:
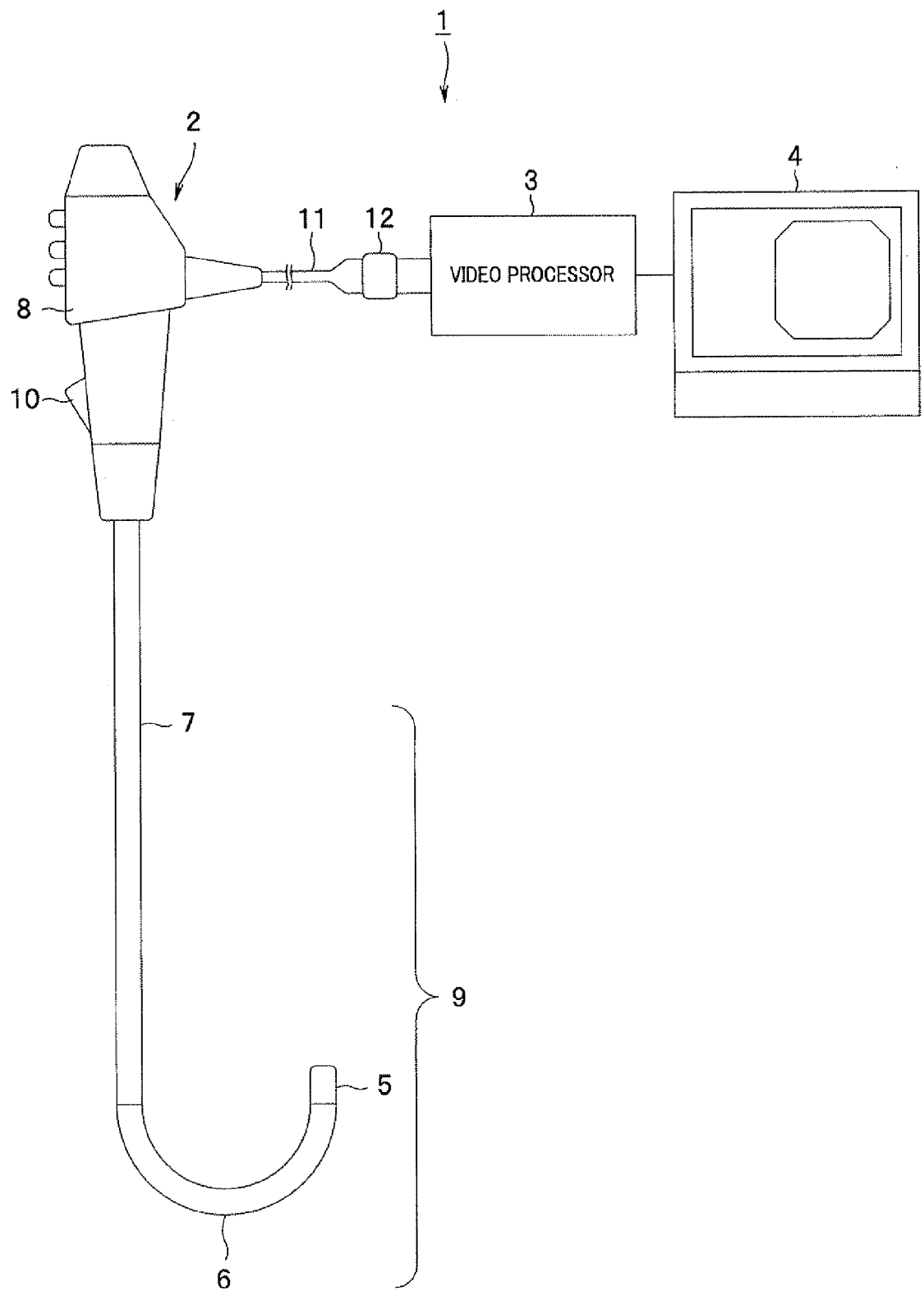
FIG. 1 is a diagram showing an overall configuration of an endoscope apparatus according to a first embodiment of the present invention.
Figure 2:
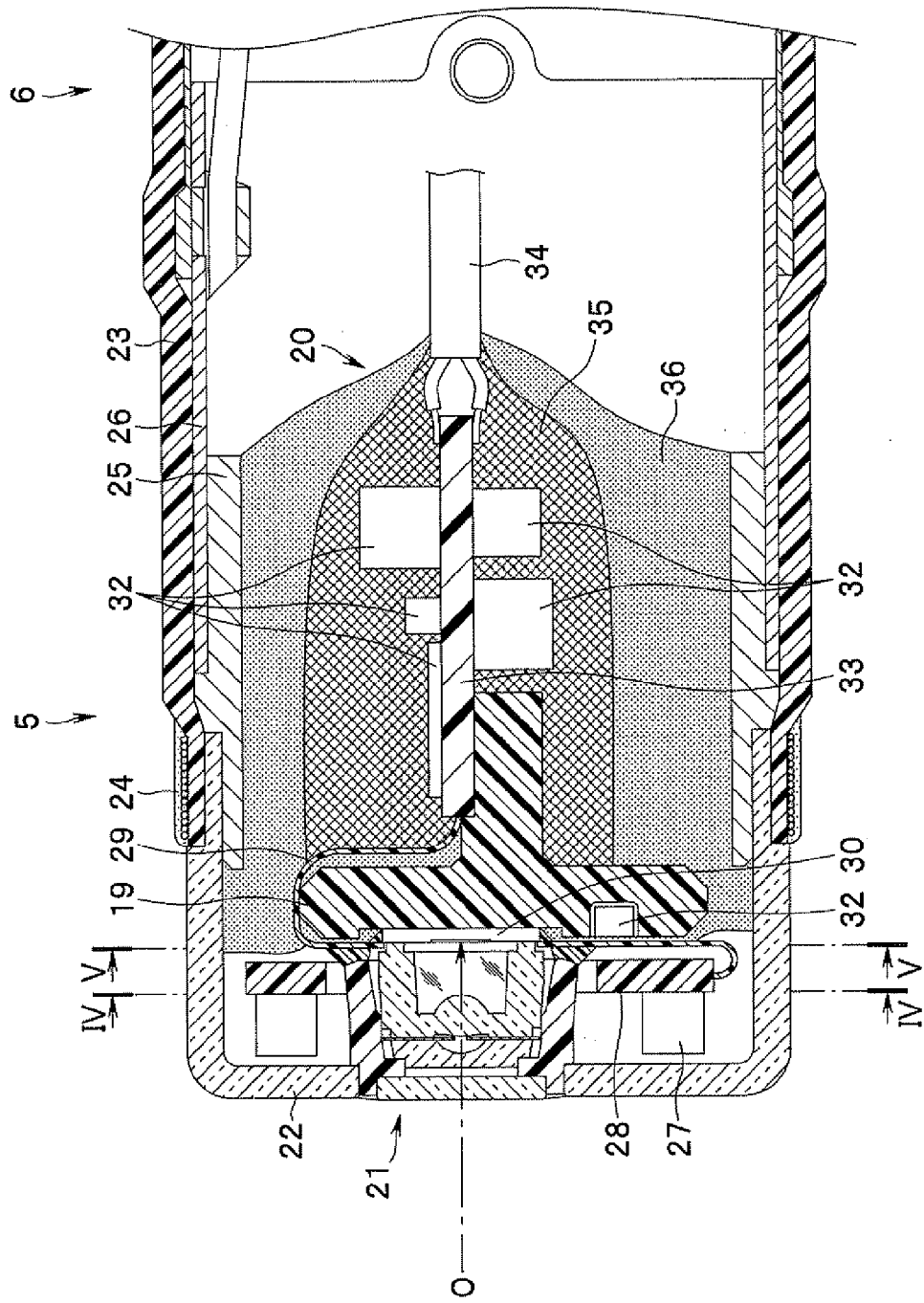
FIG. 2 is a sectional view showing a configuration of a distal rigid portion of an endoscope according to the first embodiment.
Figure 3:
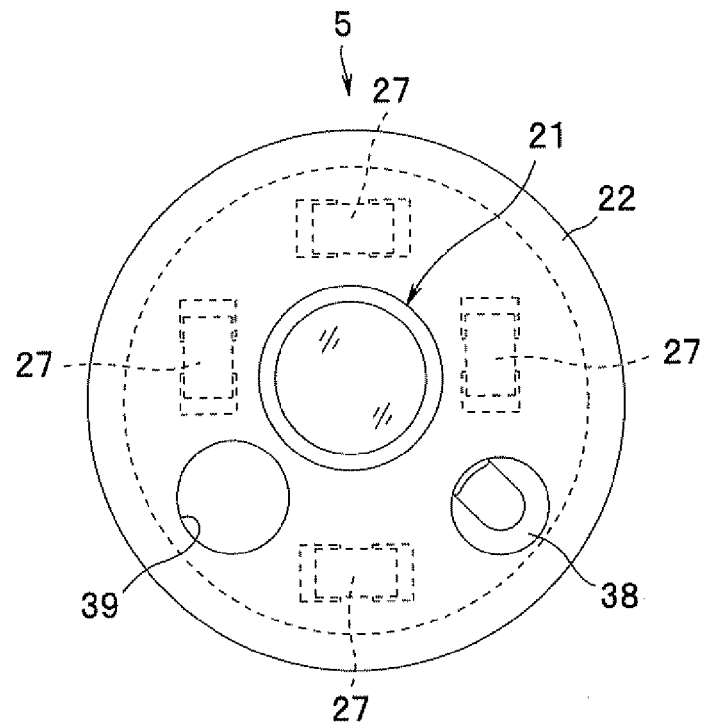
FIG. 3 is a front view showing a configuration of a distal end face of the distal rigid portion according to the first embodiment.
Figure 4:
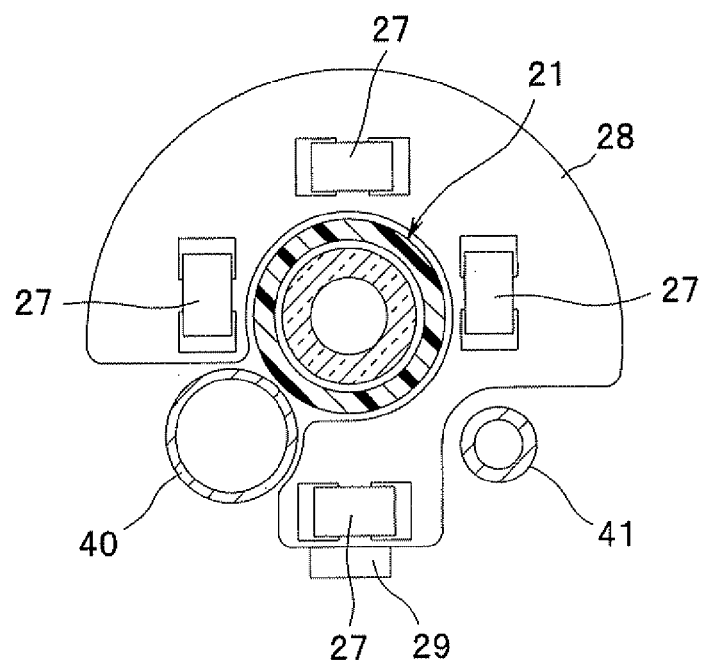
FIG. 4 is a sectional view taken along IV-IV line in FIG. 2 according to the first embodiment.
Figure 5:
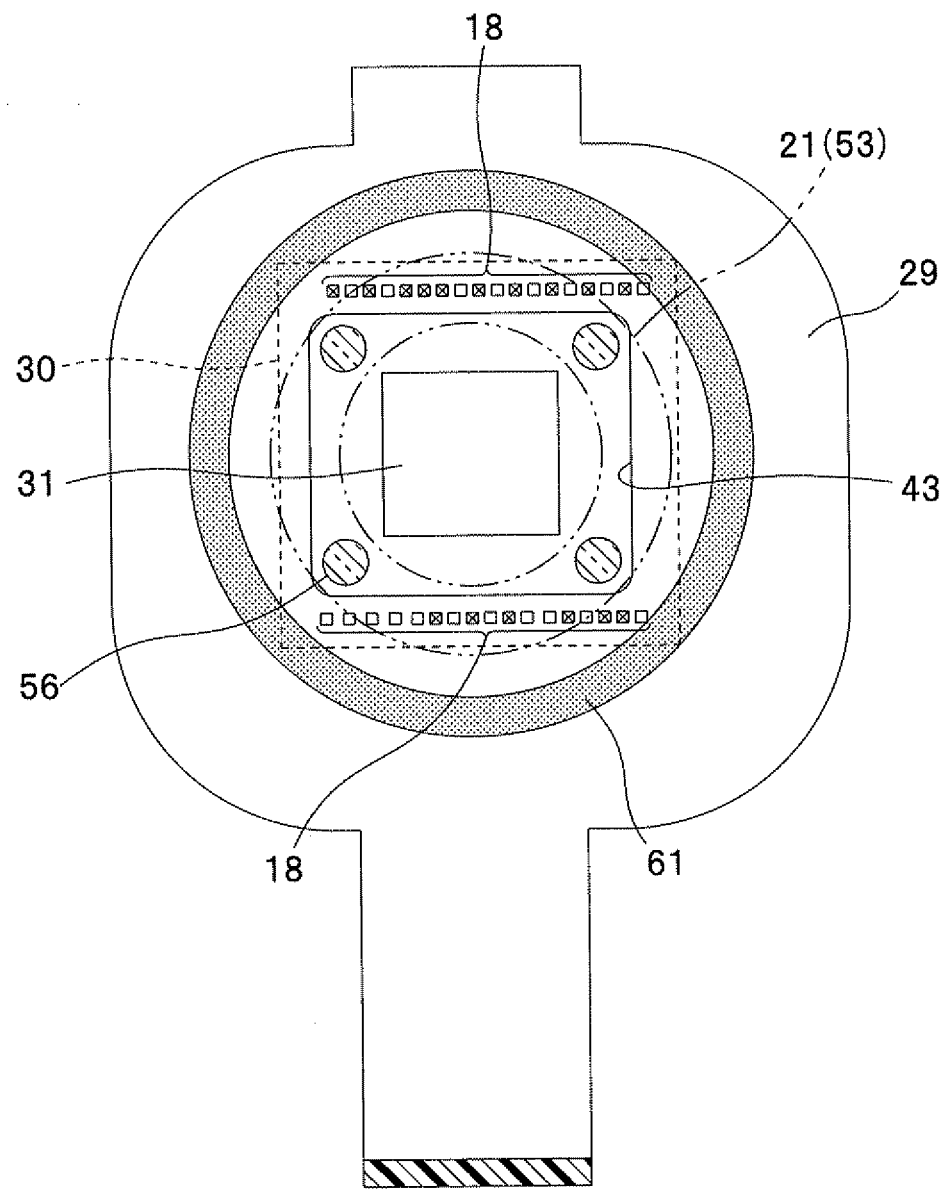
FIG. 5 is a sectional view taken along V-V line in FIG. 2 according to the first embodiment.
Figure 6:
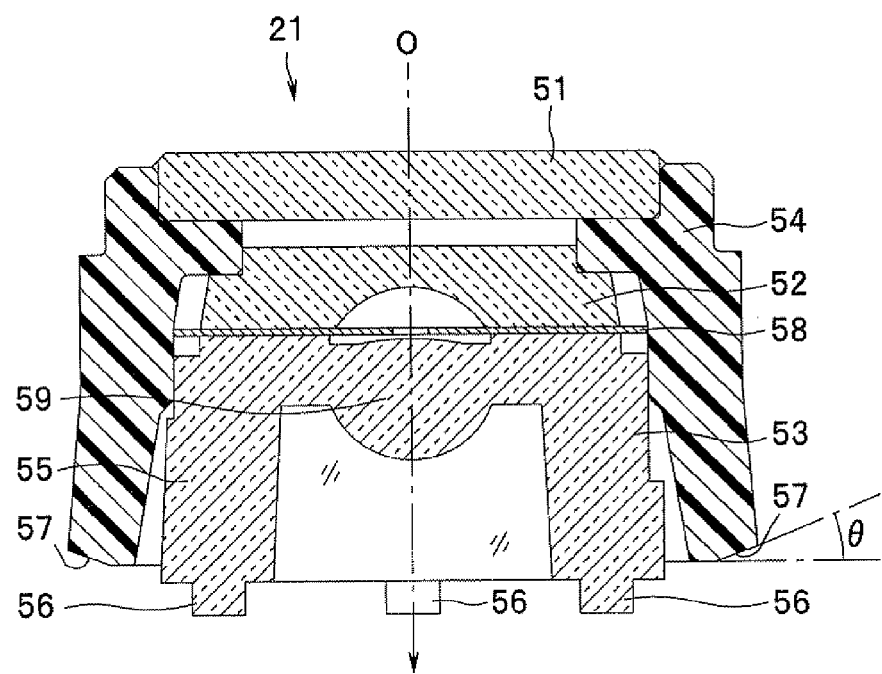
FIG. 6 is a sectional view showing a configuration of an objective lens unit according to the first embodiment.
Figure 7:
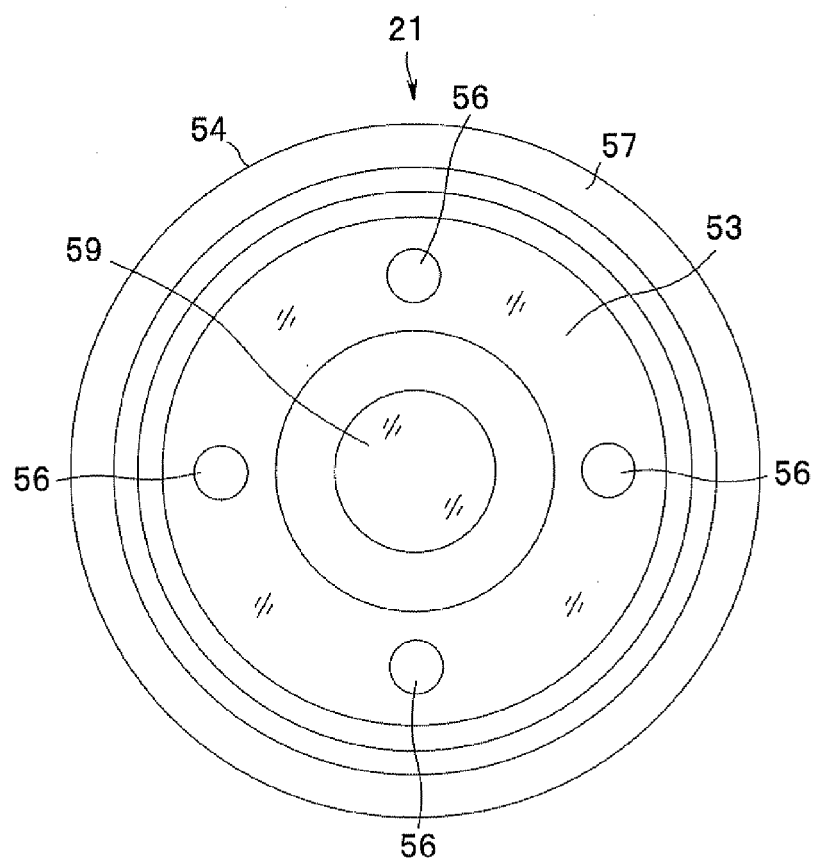
FIG. 7 is a plan view showing the objective lens unit as viewed from a rear end according to the first embodiment.
Figure 8:
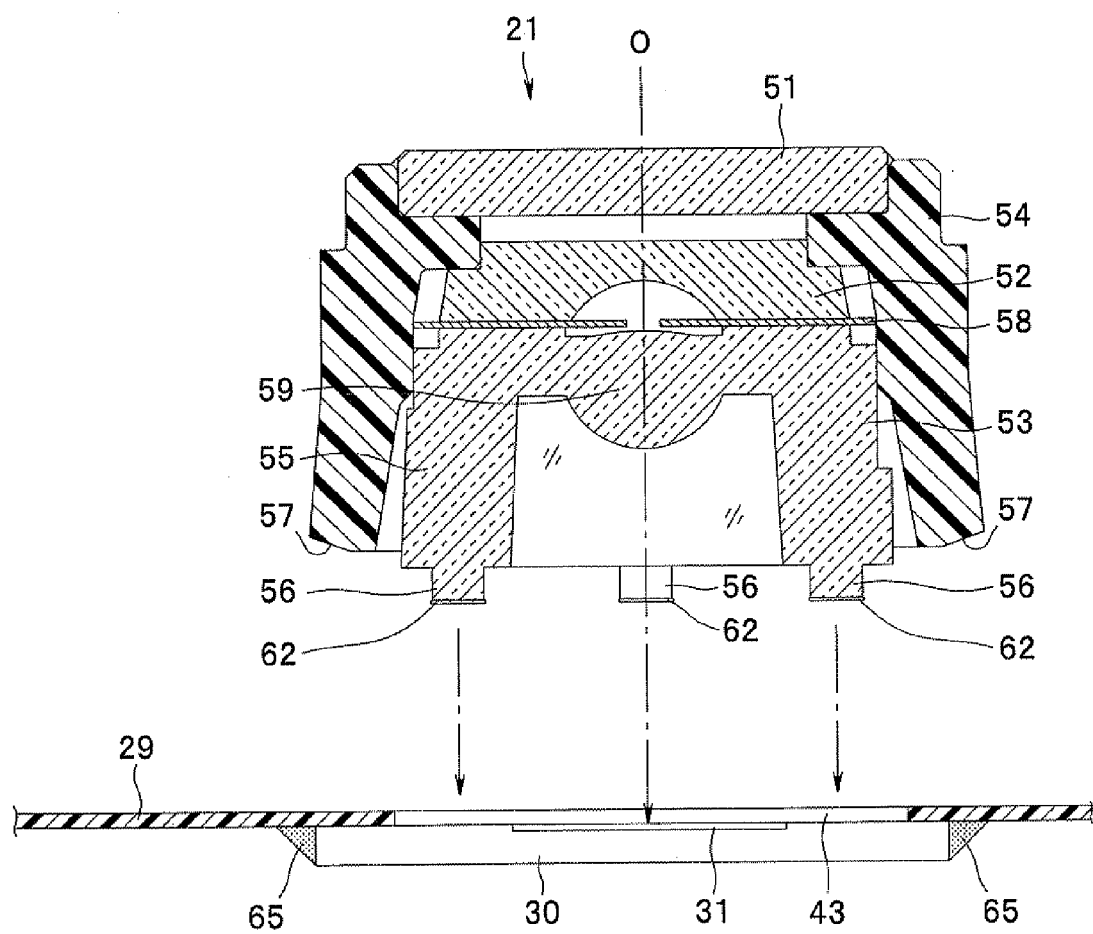
FIG. 8 is a sectional view showing the operation of assembling the objective lens unit onto an imager according to the first embodiment.
Figure 9:
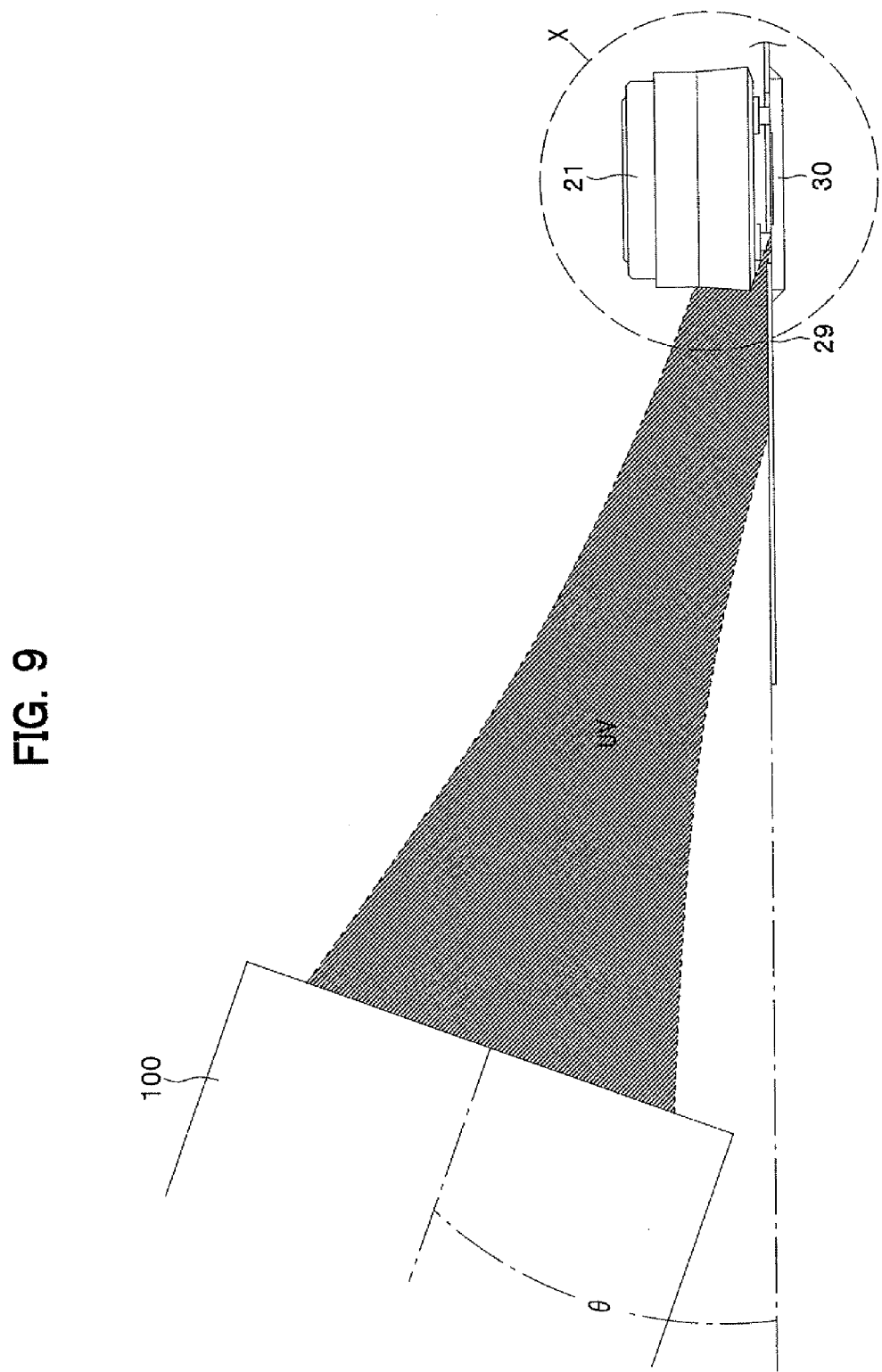
FIG. 9 is a diagram showing the operation of irradiating the objective lens unit with ultraviolet rays according to the first embodiment.
Figure 10:
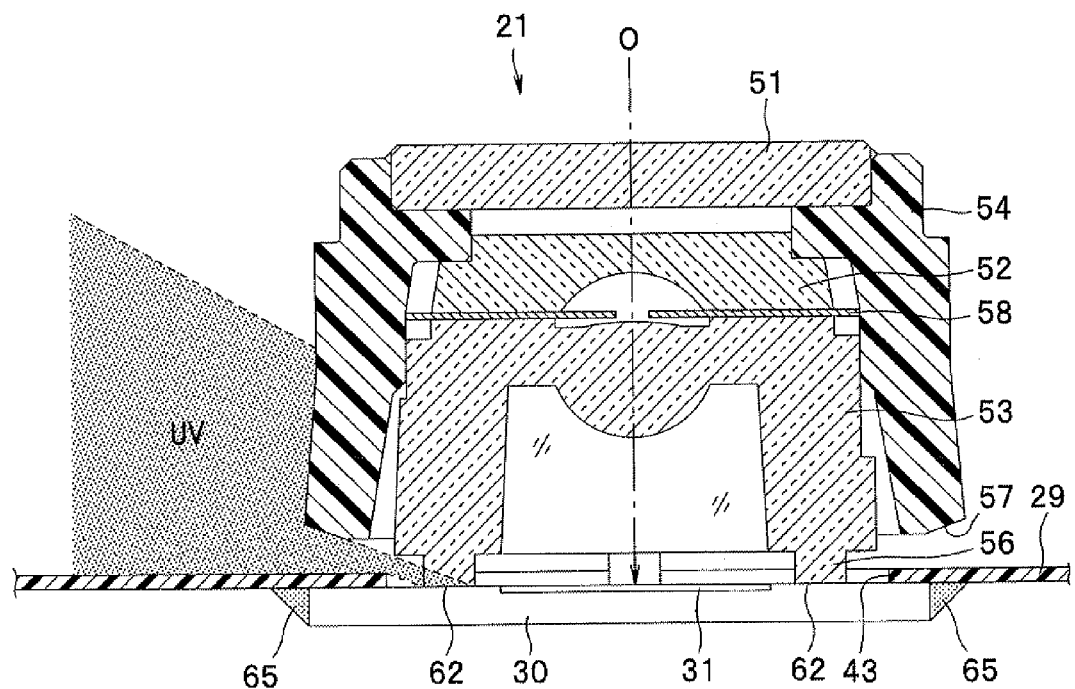
FIG. 10 is an enlarged sectional view of part enclosed in dashed circle X in FIG. 9 according to the first embodiment.
Figure 11:
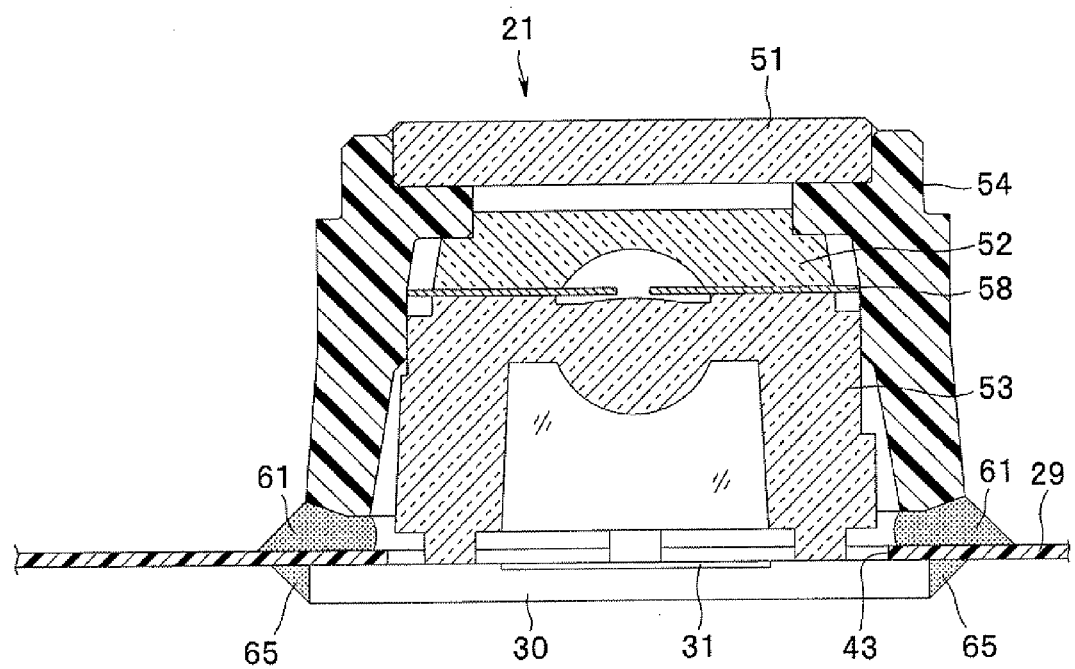
FIG. 11 is a sectional view showing the objective lens unit and imager fastened together according to the first embodiment.

FIGS. 1 to 11 relate to a first embodiment of the present invention: FIG. 1 is a diagram showing an overall configuration of an endoscope apparatus; FIG. 2 is a sectional view showing a configuration of a distal rigid portion of an endoscope; FIG. 3 is a front view showing a configuration of a distal end face of the distal rigid portion; FIG. 4 is a sectional view taken along IV-IV line in FIG. 2; FIG. 5 is a sectional view taken along V-V line in FIG. 2; FIG. 6 is a sectional view showing a configuration of an objective lens unit; FIG. 7 is a plan view showing the objective lens unit as viewed from a rear end; FIG. 8 is a sectional view showing the operation of assembling the objective lens unit onto an imager; FIG. 9 is a diagram showing the operation of irradiating the objective lens unit with ultraviolet rays; FIG. 10 is an enlarged sectional view of part enclosed in dashed circle X in FIG. 9; and FIG. 11 is a sectional view showing the objective lens unit and imager fastened together.

As shown in FIG. 1, an endoscope apparatus 1 includes an electronic endoscope (hereinafter simply referred to as an endoscope) 2, a video processor 3, and a monitor 4.

The endoscope 2 according to the present embodiment has an image pickup unit incorporated in a distal rigid portion 5 disposed at a distal end of an insertion portion 9. The image pickup unit includes an image pickup device such as CCD or CMOS which photoelectrically converts a photographic light collected by an objective optical system disposed in the distal rigid portion 5.

The video processor 3 supplies power to the image pickup device. Also, a video signal resulting from the photoelectric conversion is inputted in the video processor 3 from the image pickup device. That is, the video processor 3 processes the video signal picked up by the image pickup device, performs control including gain adjustment for the image pickup device, and outputs a drive signal.

The monitor 4 receives the video signal outputted from the video processor 3 connected thereto and displays endoscopic images.

A configuration of the endoscope apparatus 1 according to the present embodiment will be described in detail below.

The endoscope 2 according to the present embodiment includes a slender insertion portion 9 and an operation portion 8 located at a proximal end of the insertion portion 9. Also, a universal cord 11 extends from a flank of the operation portion 8, with an electrical communication cable inserted in the universal cord 11.

The endoscope 2 is detachably connected with the video processor 3 via an electrical connector 12 installed at an end of the universal cord 11. The video processor 3 can be connected with peripherals such as a video tape recorder, video printer, and video disk recorder (none is shown).

The insertion portion 9 includes the distal rigid portion 5 installed at a distal end; a bendable, bending portion 6 made up of a plurality of bending pieces and installed at a proximal end of the distal rigid portion 5; and a long, flexible tubular portion 7 installed at a proximal end of the bending portion 6.

The operation portion 8 is equipped with a bending operation lever (not shown). The bending operation lever, when turned, allows the bending portion 6 of the endoscope 2 to be bent in four or two directions.

Also, in lateral part near the distal end, the operation portion 8 has a treatment instrument insertion port 10 for use to insert a treatment instrument such as biopsy forceps or a laser probe. The treatment instrument inserted via the treatment instrument insertion port 10 is passed through a treatment instrument passage channel inside the endoscope 2. Then, a treatment portion at a distal end of the treatment instrument is protruded from the distal rigid portion 5, for example, to sample affected tissue for biopsy in the case of biopsy forceps.

Next, an internal configuration of the distal rigid portion 5 of the endoscope 2 will be described below with reference to FIG. 2.

The exterior of the distal rigid portion 5 of the insertion portion 9 is mainly formed of a ring-shaped, distal annular member 25 made of hard material such as metal and an substantially transparent distal cover 22 having optical transparency and fitted over the distal annular member 25.

Proximal part of the distal annular member 25 is fitted in distal part of the most distal of the plurality of bending pieces 26 disposed in the bending portion 6. Exterior of the distal rigid portion 5 and bending portion 6 is formed integrally with a bending rubber member 23 whose distal outer periphery covers a proximal outer periphery of the distal cover 22 integrally with the plurality of bending pieces 26 by being fastened by thread bonding 24.

An image pickup unit 20, i.e., an image pickup apparatus which picks up subject images, has been fitted in the distal annular member 25 of the distal rigid portion 5, the image pickup unit 20 having an objective lens unit 21 in forward part (a configuration of the image pickup unit 20 will be described in detail later).

The image pickup unit 20 according to the present embodiment includes a plurality of LEDs 27 (four LEDs, here) serving as lighting parts and disposed on an end face which faces forward part of a rigid LED board 28 through which the objective lens unit 21 is passed at an approximate center.

The image pickup unit 20 includes a main board 33 which is connected with a complex signal line 34 containing a plurality of coaxial lines or single lines. A plurality of electronic parts 32 including a capacitor, bear chip, image pickup signal output transistor, and IC (integrated circuits) are mounted on the main board 33. Also, the image pickup unit 20 includes a holding member 19 T-shaped in cross section and an imager 30 such as a CMOS or CCD, where the holding member 19 is connected to a front side of the rigid main board 33 to hold the electronic parts 32, and the imager 30, being disposed on a front face of the holding member 19, photoelectrically converts a photographic light collected by the objective lens unit 21. Furthermore, the image pickup unit 20 includes a flexible printed board 29 used to exchange drive signals, image pickup signals, and the like between the main board 33 and other components—the imager 30 and LEDs 27.

The image pickup unit 20 is filled with an adhesive 35 of insulating sealing resin from a distal part of the complex signal line 34 to a proximal end portion of the holding member 19 to maintain insulation, strength, and the like. Incidentally, the adhesive 35 may have its outer circumference covered integrally with heat-shrinkable tubing.

The image pickup unit 20 configured as described above is passed through the distal annular member 25 so that distal part of the objective lens unit 21 will be inserted and fitted in the distal cover 22, and is fastened in the distal rigid portion 5 with space around the image pickup unit 20 being filled with an adhesive 36 of insulating sealing resin.

Next, components installed on a distal end face of the distal rigid portion 5 will be described below with reference to FIG. 3 and an internal configuration of the distal rigid portion 5 related to the components will be described below with reference to FIGS. 4 and 5.

As shown in FIG. 3, a distal-side lens of the objective lens unit 21 is disposed on the distal end face of the distal rigid portion 5 so as to be exposed from an approximate center of the distal end face. An air/water supply nozzle 38 for use to supply air and water toward the surface lens of the objective lens unit 21 and a treatment instrument channel opening 39 for use to pass a treatment instrument or suck filth which will obstruct observation of a body cavity are installed in the distal end face of the distal rigid portion 5. Apparatuses which implement the air/water supply and suction functions of the endoscope 2 have been used conventionally and are not shown in FIG. 1, and thus description thereof will be omitted.

With the endoscope 2 according to the present embodiment, the distal cover 22, which is substantially transparent, allows the four LEDs 27 to be seen through the distal cover 22 when viewed from the front, the four LEDs 27 being disposed around the objective lens unit 21 in the distal rigid portion 5 to emit an illuminating light to a subject to be examined.

As described above, the four LEDs 27 are disposed on the LED board 28 (see FIG. 4). The LED board 28, which is an approximately disk-shaped substrate with a plurality of notches, is configured to allow insertion and installation of the objective lens unit 21 located at the approximate center, a conduit 41 communicated with the air/water supply nozzle 38 installed on the distal end face, and a treatment instrument channel 40.

Also, the flexible printed board 29 is connected to the LED board 28, being located below the LED board 28 when FIG. 4 is viewed toward the sheet.

As shown in FIG. 5, an approximately square hole 43 which constitutes a flexible-board opening is formed in the flexible printed board 29. The imager 30 is bonded to rear part of the flexible printed board 29 so that a light-receiving unit 31 will face forward in the hole 43.

One side of the hole 43 is set longer than one side of the light-receiving unit 31 of the imager 30. That is, the front part of the imager 30 is exposed between an edge of the hole 43 in the flexible printed board 29 and edge of the light-receiving unit 31 of the imager 30, being separated by a predetermined distance. In this state, the imager 30 is electrically connected with a plurality of signal pads arranged in rows above and below the hole 43 in the flexible printed board 29.

As described in detail later, in the objective lens unit 21, four legs 56 of a third lens 53 (see FIG. 6) are bonded to the front part of the imager 30, the front part of the imager 30 being located around the light-receiving unit 31 and exposed through the hole 43, and rear portion of a lens barrel 54 (see FIG. 6) is fastened to a front face of the flexible printed board 29 with an adhesive 61.

Next, configuration of the objective lens unit 21 disposed in the image pickup unit 20 according to the present embodiment will be described below with reference to FIGS. 6 and 7.

As shown in FIG. 6, the objective lens unit 21 has an objective lens group held by the lens barrel 54 approximately cylindrical in shape and, for example, black in color, where the objective lens group contains a first lens 51, a second lens 52, and the third lens 53 in order from the side of an imaging subject forward of the objective lens unit 21. A diaphragm 58 is sandwiched and installed between the second lens 52 and third lens 53. To maintain optical performance of the objective lens group, the black lens barrel 54 is made of metal or light-tight synthetic resin.

According to the present embodiment, the first lens 51, which is exposed from the distal rigid portion 5, is a glass lens resistant to chemicals. On the other hand, the second lens 52 and third lens 53 are plastic lenses which are inexpensive and easy to work on.

The lenses 51 to 53 are fitted and held in the lens barrel 54, being optically centered on a photographic optical axis O to obtain a predetermined level of optical performance.

The third lens 53 includes a lens portion 59 which is approximately cylindrical in shape and through which the photographic optical axis O passes; and a trunk 55 which extends rearward approximately annularly from outer peripheral part of a lens portion 59 and does not have optical functions. The four legs 56 columnar in shape extend from a rear end face of the trunk 55 at approximately equal intervals around a circumference of the trunk 55.

As can be seen from FIG. 6, the trunk 55 with the legs 56 extends beyond the lens barrel 54. All that is required of the trunk 55 is that at least only the legs 56 extend beyond the lens barrel 54.

A tapered surface 57 is formed over an entire circumference of the lens barrel 54 which holds the objective lens group as described above, with the rear end face of the lens barrel 54 being tilted forward at a predetermined angle $\theta(\theta=20$ to 30 degrees according to the present embodiment) as the rear end face extends outward (the upward direction in FIG. 6 corresponds to the forward direction while the downward direction in FIG. 6 corresponds to the rearward direction). In other words, the lens barrel 54 has a surface inclined forward at the predetermined angle $\theta$ along a longitudinal axis over the entire circumference of the rear end face so that outer circumferential part of the rear end face will be located forward of inner circumferential part of the rear end face. That is, the tapered surface 57 is formed in such a way that distance from the imager 30 to be fastened later will be increased toward an outer circumference of the lens barrel 54.

With the objective lens unit 21 according to the present embodiment configured as described above, an assembly method for assembling the objective lens unit 21 onto the imager 30 in such a way as to satisfy a specified level of optical performance will be described below with reference to FIGS. 8 to 10.

First, as shown in FIG. 8, the objective lens unit 21 has a light-curing adhesive 62 applied to the legs 56 of the third lens 53. The light-curing adhesive 62 may be an ultraviolet-curing (UV-curing) or visible-light-curing type, both of which are widely used, and an ultraviolet-curing (UV-curing) adhesive is used according to the present embodiment.

The objective lens unit 21 is placed on the imager 30 exposed through the hole 43 in the flexible printed board 29, in such a way that end faces of the four legs 56 on a rear side (on a downside in FIG. 8) of the objective lens unit 21 will oppose and abut the imager 30. A marginal edge of the imager 30 is fastened to the flexible printed board 29 with an adhesive 65.

The objective lens unit 21 is placed with the photographic optical axis O positioned such that the optical performance specified for the light-receiving unit 31 of the imager 30 will be satisfied. The objective lens unit 21 may be placed on the imager 30 either manually by an operator using a microscope or mechanically using a suction device.

Next, as shown in FIG. 9, ultraviolet (UV) rays are emitted from an ultraviolet (UV) irradiator toward outer periphery of the objective lens unit 21 placed on the imager 30. Preferably, the UV light is emitted at the same angle as the predetermined angle θ of the tapered surface 57 formed on the lens barrel 54 of the objective lens unit 21.

As shown in FIG. 10, most of the UV light is blocked by the lens barrel 54 and flexible printed board 29, and the UV light reaches only to the part between the lens barrel 54 and imager 30, traveling along the tapered surface 57 formed in rear end part of the lens barrel 54.

That is, when the UV light reaches the part where the four legs 56 of the lens barrel 54 are in surface contact with the imager 30, the light-curing adhesive 62 begins to cure. By directing UV light at the objective lens unit 21 from four directions along the four legs 56 using a UV irradiator 100, the present embodiment makes it possible to fasten the objective lens unit 21 and the imager 30 together easily in a short period of time.

Incidentally, as shown in FIG. 4, the end faces of the four legs 56 are fastened to the exposed front part of the imager 30 by the light-curing adhesive 62, the exposed front part of the imager 30 being separated from the edge of the light-receiving unit 31 of the imager 30 by a predetermined distance.

Finally, to keep out dirt, dust, and the like as well as to fix the objective lens unit 21, flexible printed board 29, and imager 30 to each other, a black epoxy adhesive 61, for example, is applied to the entire circumference of the rear end part of the lens barrel 54 where the tapered surface 57 is located as shown in FIG. 11, and then the lens barrel 54 and flexible printed board 29 are fastened together. The tapered surface 57 of the lens barrel 54 is tilted backward as the tapered surface 57 extends rearward. That is, a clearance between the tapered surface 57 and front part of the imager 30 decreases toward the inner side to prevent the adhesive 61 from flowing toward the imager 30.

Also, viscosity of the adhesive 61 has been adjusted to some extent to further prevent inflow of the adhesive 61 into the imager 30.

In this way, the objective lens unit 21, flexible printed board 29, and imager 30 are fastened together firmly to complete the image pickup unit 20. Then, the image pickup unit 20 assembled in this way is incorporated into the distal rigid portion 5 of the endoscope 2.

As described above, with the image pickup unit 20 according to the present embodiment, formation of the tapered surface 57 on the rear end part of the lens barrel 54 allows the use of a light-curing adhesive to reduce the time required to hold the objective lens unit 21 and imager 30 in a manufacturing phase to ensure a predetermined level of optical performance.

Consequently, with the image pickup unit 20 according to the present embodiment, it is possible to reduce optical defects during manufacturing and thereby improve yields. Furthermore, since the lenses other than the first lens 51 on a surface of the endoscope 2 are plastic lenses which can be worked on easily, it is possible to achieve price reduction of the image pickup unit 20.

(Second Embodiment)

Next, a second embodiment of the present invention will be described below.

Figure 12:
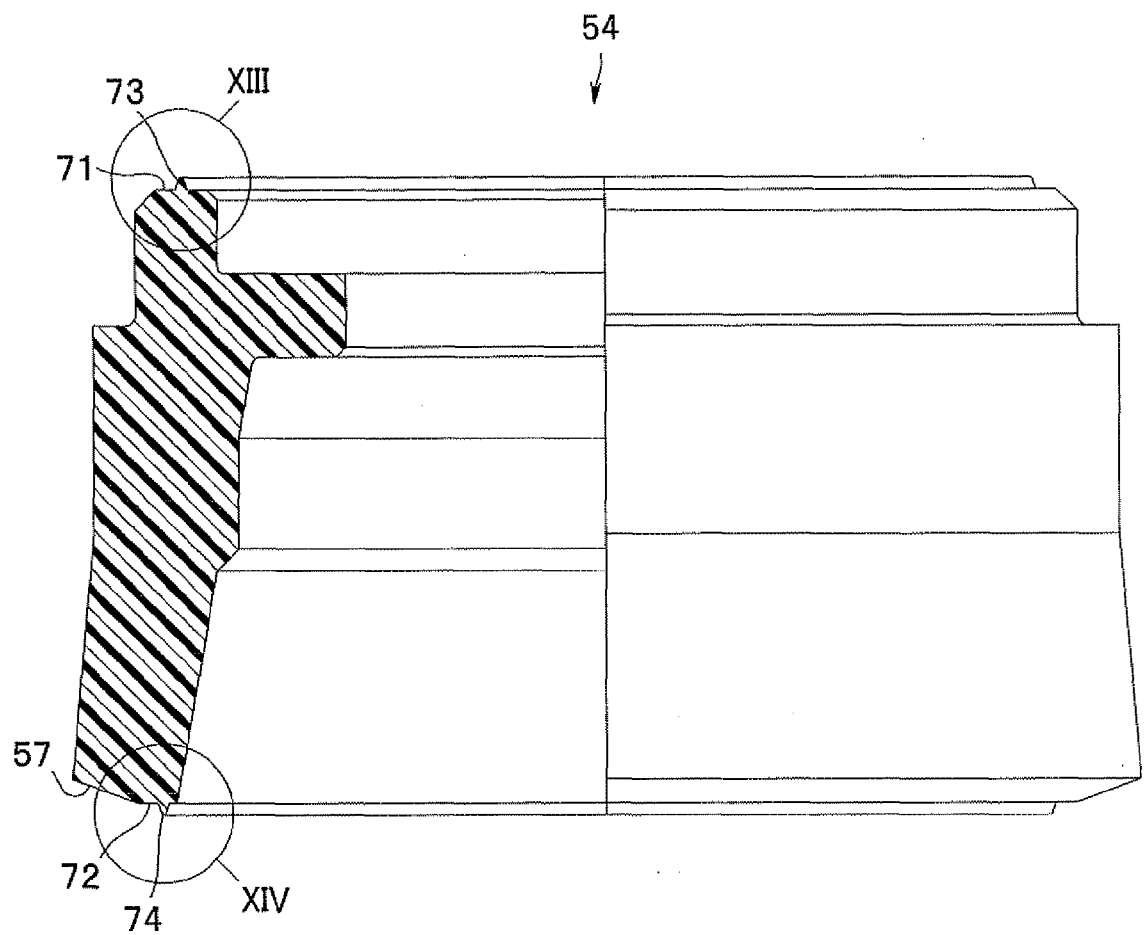
FIG. 12 is a partial sectional view of an injection-molded lens barrel according to a second embodiment of the present invention.
Figure 13:
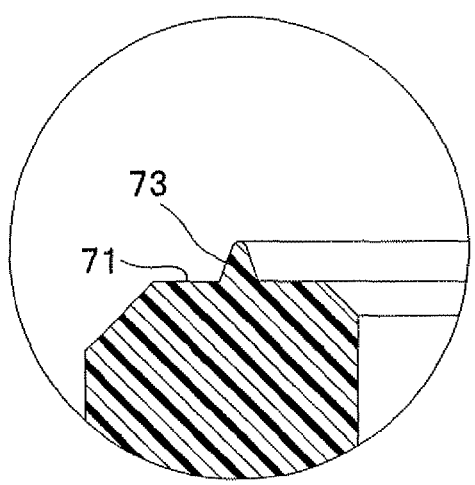
FIG. 13 is an enlarged view of part enclosed in circle XIII in FIG. 12 according to the second embodiment.
Figure 14:
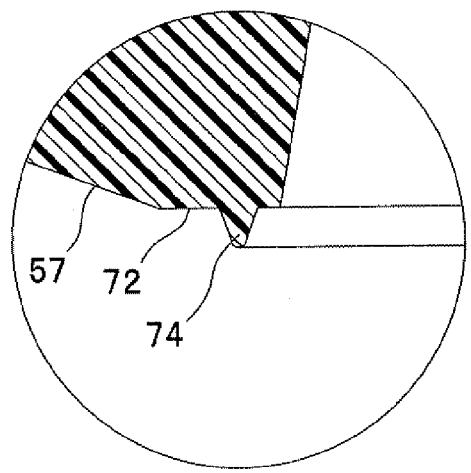
FIG. 14 is an enlarged view of part enclosed in circle XIV in FIG. 12 according to the second embodiment.
Figure 15:
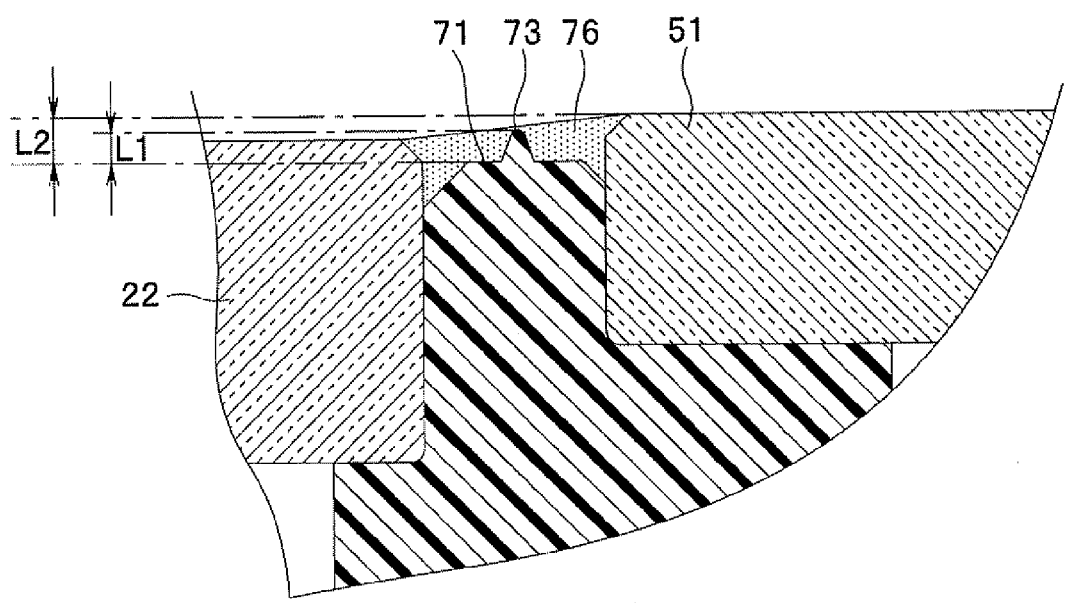
FIG. 15 is a sectional view showing a distal part of a distal rigid portion according to the second embodiment.
Figure 16:
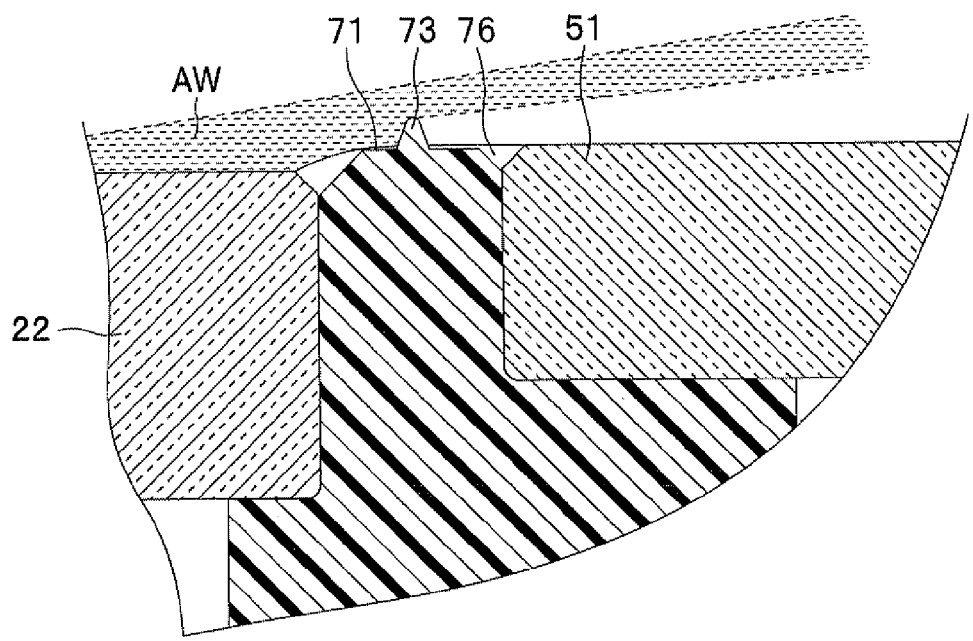
FIG. 16 is a sectional view showing the distal part of the distal rigid portion to illustrate air/water supply operation according to the second embodiment.
Figure 17:
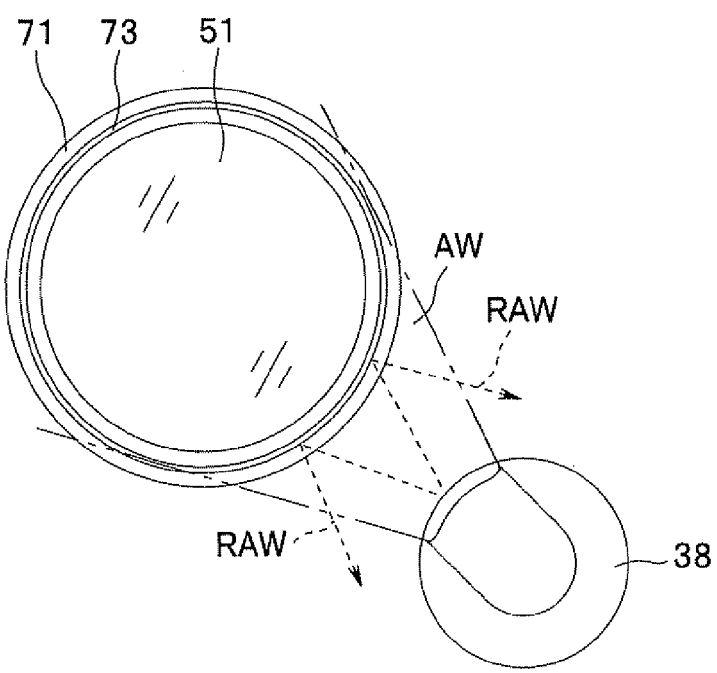
FIG. 17 is a plan view showing an air/water supply nozzle and a first lens to illustrate the air/water supply operation according to the second embodiment.
Figure 18:
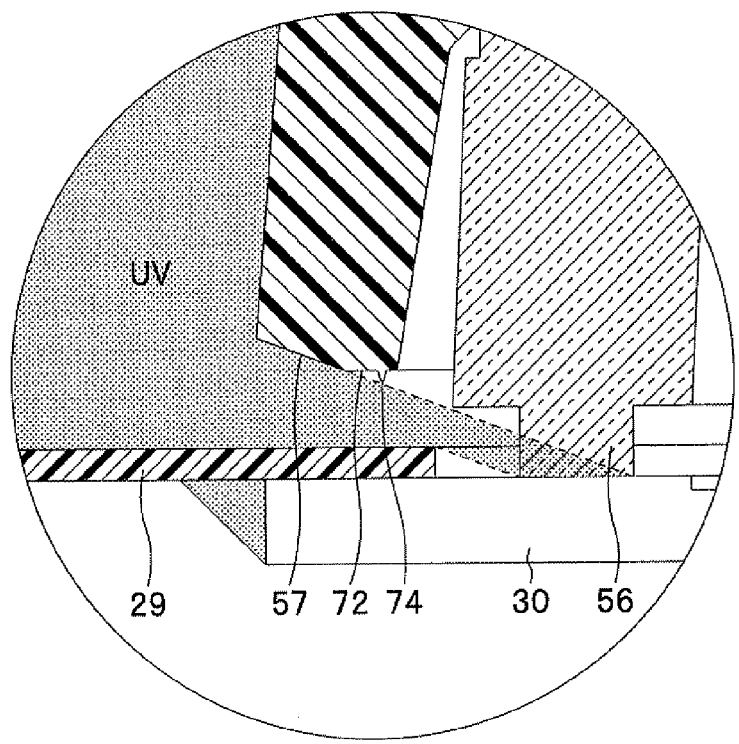
FIG. 18 is a diagram showing the operation of irradiating an objective lens unit with ultraviolet rays according to the second embodiment.
Figure 19:
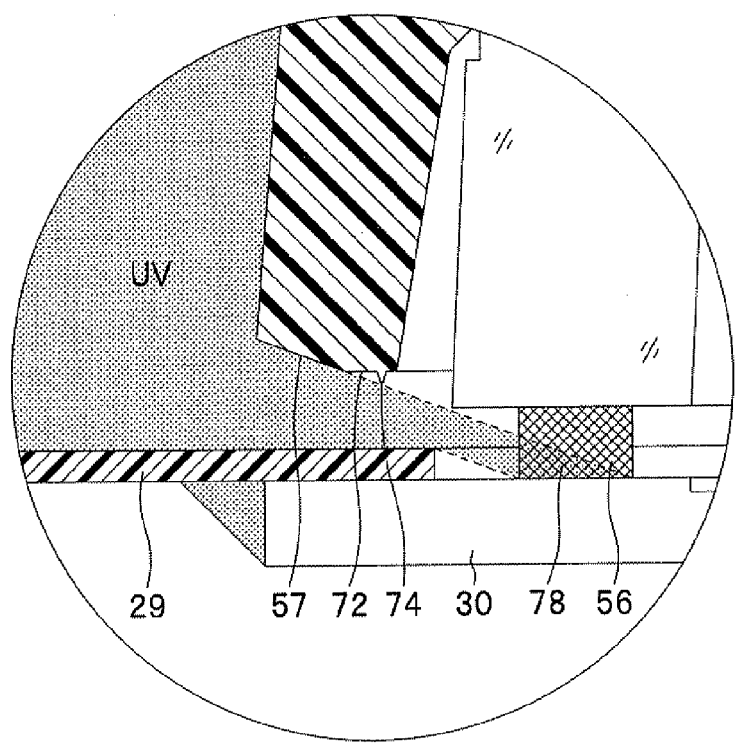
FIG. 19 is a diagram showing the operation of irradiating an objective lens unit with ultraviolet rays according to a variation of the second embodiment.

FIGS. 12 to 19 relate to a second embodiment: FIG. 12 is a partial sectional view of an injection-molded lens barrel; FIG. 13 is an enlarged view of part enclosed in circle XIII in FIG. 12; FIG. 14 is an enlarged view of part enclosed in circle XIV in FIG. 12; FIG. 15 is a sectional view showing a distal part of a distal rigid portion; FIG. 16 is a sectional view showing the distal part of the distal rigid portion to illustrate air/water supply operation; FIG. 17 is a plan view showing an air/water supply nozzle and a first lens to illustrate the air/water supply operation; FIG. 18 is a diagram showing the operation of irradiating an objective lens unit with ultraviolet rays; and FIG. 19 is a diagram showing the operation of irradiating an objective lens unit with ultraviolet rays according to a variation of the second embodiment.

In the following description, the same components as those of the endoscope apparatus and especially the objective lens unit according to the first embodiment will be denoted by the same reference numerals as the corresponding components in the first embodiment, and detailed description thereof will be omitted.

According to the present embodiment, the configuration will be described where the lens barrel 54 of the objective lens unit is injection-molded from synthetic resin instead of metal from the viewpoint of workability. In the injection molding, a parting of a mold leaves burrs constituting a protrusion approximately 0.1 mm high on the lens barrel 54 between a plurality of molds.

According to the present embodiment, for example, as shown in FIGS. 12 to 14, it is assumed that as a result of injection molding, the parting of the mold has produced, on the lens barrel 54, burrs 73 protruding forward from a distal end face 71 located on a front side and burrs 74 protruding backward from a proximal end face 72 located on a rear side.

Normally, the burrs 73 and 74 are removed by polishing, but the polishing process not only adds to manufacturing time, but also adds the process of washing chips off the lens barrel 54 to maintain optical performance. This complicates processes and thereby increases the possibility that part of the lens barrel 54 will be deformed during manufacturing.

Thus, according to the present embodiment, the polishing process and chip removal process are omitted, and instead the burrs 73 constituting a protrusion which protrudes from the distal end face 71, i.e., from a front end face of the lens barrel 54 on the side of the imaging subject, is covered with an adhesive 76 between the distal cover 22 and the first lens 51 as shown in FIG. 15 when the objective lens unit 21 is assembled onto the distal cover 22.

Specifically, protrusion length L1 of the burrs 73 from the distal end face 71 is set smaller than distance L2 from the distal end face 71 to a surface of the first lens 51 (L2>L1). That is, the protrusion length L1 and distance L2 satisfy L2−L1>0. In other words, the burrs 73 protrude from the distal end face 71 between the lens surface of the first lens 51 on the side of the imaging subject and the distal end face 71 of the lens barrel 54.

By applying the adhesive 76 in such a way that a marginal edge of the distal cover 22 and marginal edge of the first lens 51 will be joined by an approximately flat surface, the endoscope 2 according to the present embodiment is configured such that the burrs 73 will not protrude from the distal end face of the distal rigid portion 5.

For example, as shown in FIGS. 16 and 17, since the burrs 73 protrude from the distal end face of the distal rigid portion 5, wash water or air (AW in the figures) ejected through the air/water supply nozzle 38 hits the burrs 73, blocking a flow along an ejection direction toward the surface of the first lens 51.

Specifically, the wash water or air (AW) has its flow along the surface of the first lens 51 blocked as shown in FIG. 16 and has its flow along the distal end face of the distal rigid portion 5 of the endoscope 2—the most important flow—bounced off the burrs 73 as indicated by dashed arrow RAW in FIG. 17. This obstructs cleaning of impurities such as mucous membranes and filth which lower observation performance by clinging to the surface of the first lens 51.

Thus, even though the manufacturing process of the injection-molded lens barrel 54 is simplified, by configuring the endoscope 2 such that the burrs 73 will not protrude from the distal end face of the distal rigid portion 5 as described above, the present embodiment avoids obstructing the air/water supply nozzle 38 in cleaning the surfaces of the first lens 51.

In order not to obstruct emission of the UV light to the legs 56 of the third lens 53 coated with the light-curing adhesive 62 (see FIGS. 8 and 9), a combination of injection-molding dies is determined such that the burrs 74 protruding from the proximal end face 72, i.e., the rear end face of the lens barrel 54 on the side of the imager 30, will be formed at a position closer to the optical axis O on the side of the third lens 53 as shown in FIG. 18. In other words, the burrs 74 are formed on that part of the proximal end face 72 which is close to an inner circumferential side of the lens barrel 54.

Furthermore, the legs 56 of the third lens 53 have their outer circumferential surfaces grained to scatter the emitted UV light. This allows the surface coated with the light-curing adhesive 62 to be irradiated evenly with the scattered light. The graining of the outer circumferential surfaces of the legs 56 is performed by a secondary machining process such as blasting, plasma processing, or chemical processing.

(Third Embodiment)

Next, a third embodiment of the present invention will be described below.

Figure 20:
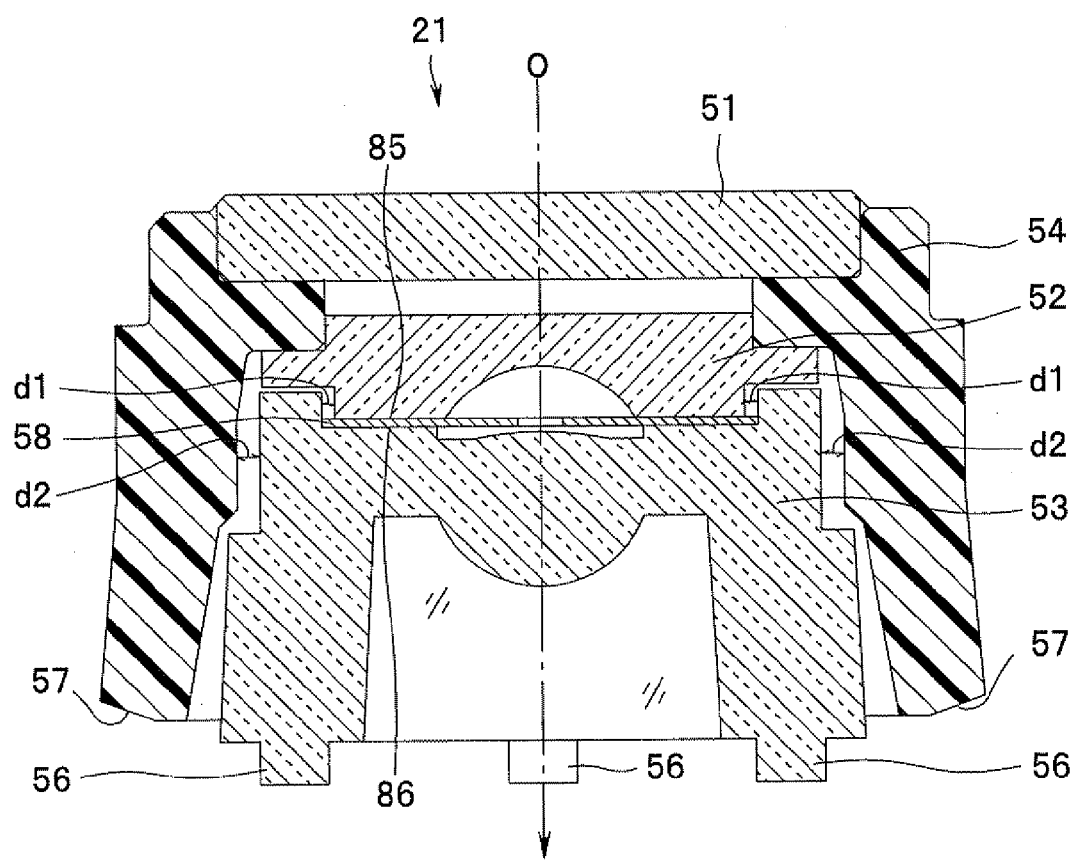
FIG. 20 is a sectional view of an objective lens unit according to a third embodiment of the present invention.

FIG. 20 is a sectional view of an objective lens unit according to a third embodiment of the present invention. Again, in the following description, the same components as those of the endoscope apparatus and especially the objective lens unit according to the first embodiment will be denoted by the same reference numerals as the corresponding components in the first embodiment, and detailed description thereof will be omitted.

As shown in FIG. 20, in the objective lens unit 21 according to the present embodiment, only the first lens 51 and second lens 52 are fitted firmly in the lens barrel 54 and the third lens 53 is fastened to the second lens 52 via the diaphragm 58.

Specifically, the third lens 53 has a recess formed on its front face (i.e., the upper side of the third lens 53 in FIG. 20) through which photographic light enters along the photographic optical axis O. The diaphragm 58 contoured to outer shape of the third lens 53 is fitted in the recess in surface contact with the recess. The third lens 53 has an outside diameter smaller than an inside diameter of the lens barrel 54.

The second lens 52 fitted firmly in the lens barrel 54 has a projection on its back side to loosely fit in the recess in the third lens 53.

The second lens 52 and third lens 53 with the diaphragm 58 placed between them are bonded together securely by a light-curing adhesive or the like. To satisfy specified optical performance and to make it easy to align the optical axes O passing through the second lens 52 and third lens 53, a predetermined clearance d1 is provided between outside diameter of the projection which has an abutting surface 85 on which the second lens 52 comes into surface contact with the diaphragm 58 and inside diameter of the recess which has an abutting surface 86 on which the third lens 53 comes into surface contact with the diaphragm 58.

That is, the clearance d1 is provided in circumferential directions of the second lens 52 and third lens 53 so that the photographic optical axis O can pass through predetermined positions of the second lens 52 and third lens 53 bonded together. Also, the clearance d2 is provided in circumferential directions, separating the third lens 53 and lens barrel 54, so that the third lens 53 can change its position in relation to the second lens 52 within the bounds of the clearance d1.

As described above, by increasing molding accuracies of the surfaces of the second lens 52 and third lens 53 fastened via the diaphragm 58, the objective lens unit 21 according to the present embodiment is configured to allow such accurate alignment in the process of manufacture as to satisfy a predetermined level of optical performance.

Thus, in addition to advantages of the first embodiment, the objective lens unit 21 according to the present embodiment has the advantage of increasing the ease of assembly by ensuring that the optical axes of the second lens 52 and third lens 53 can be aligned using the relatively wide abutting surfaces 85 (86) while maintaining high optical performance. This reduces optical defects during manufacturing and thereby improves yields of the image pickup unit 20 itself.

REFERENCE EXAMPLE

The monitor 4 which displays endoscopic images by being connected to the endoscope 2 displays images formed by the objective lens, by partially masking the images mechanically or electronically. For example, as shown in FIG. 1, some wide-angle lenses used for the endoscope 2 provide an octagonal display by cutting off four corners.

Normally, the lenses incorporated in the objective lens unit 21, which are often processed by polishing, have a symmetrical structure with respect to a center axis. However, the display on the monitor 4 is not circular, and images corresponding to those parts which are not displayed on the monitor 4 are also formed by the objective lens unit 21.

Thus, an example of an objective lens unit 21, a first lens 51 in particular, configured not to collect and focus light on dead zones of a masked photographic image, i.e., on zones which are not displayed on the monitor, will be described with reference to FIG. 21.

Figure 21:
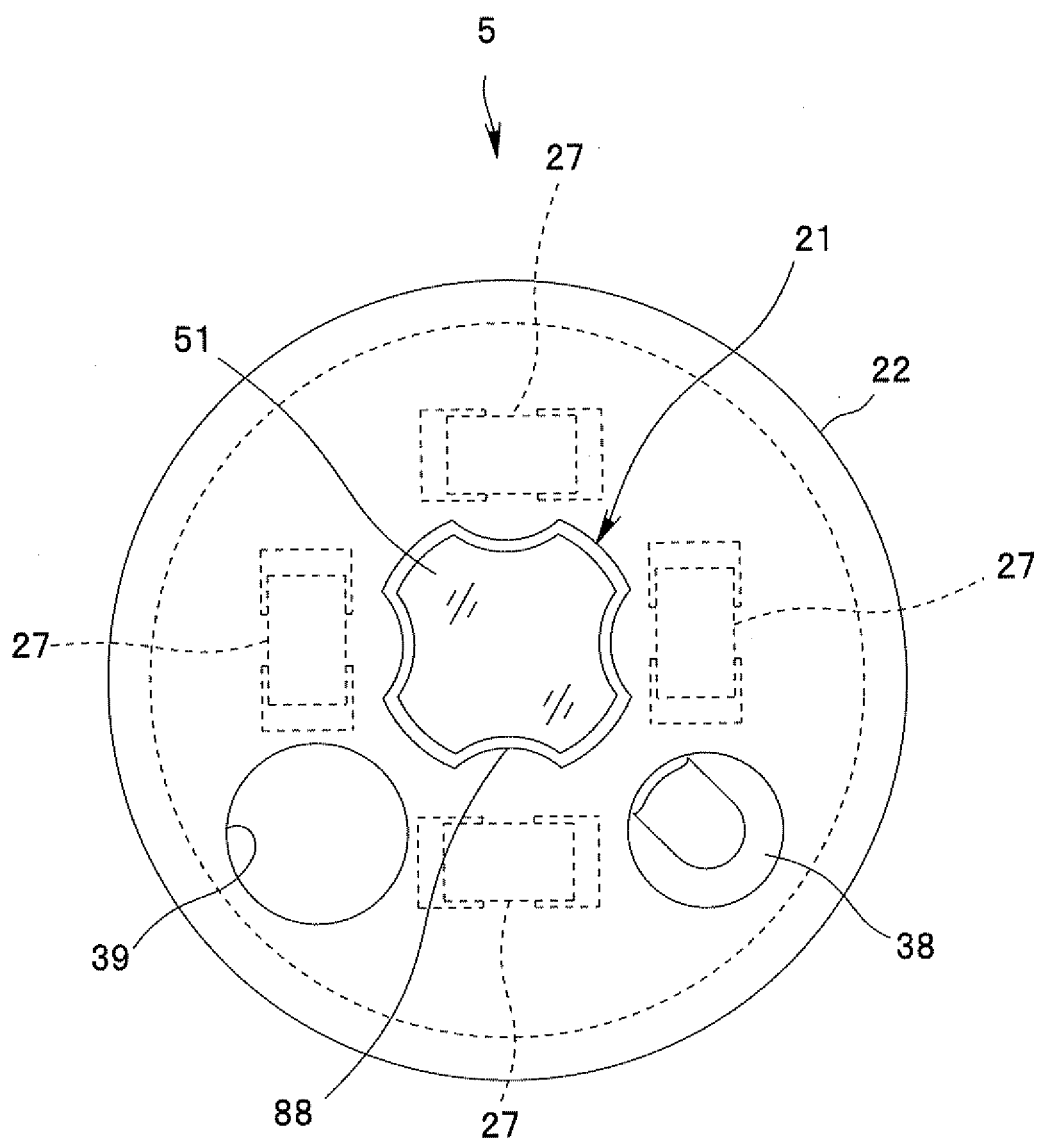
FIG. 21 is a plan view showing a distal end face of a distal rigid portion of an electronic endoscope according to a reference example.

As shown in FIG. 21, arc-shaped segments are cut off from the first lens 51 of the objective lens unit 21 according to the present reference example at four circumferential locations (left, right upper, and lower in FIG. 21), the first lens 51 being disposed on the distal end face of the distal rigid portion 5 of the endoscope 2. Segments 88 cut off from the first lens 51 correspond to the dead zones described above and the remaining part corresponds to the octagonal display screen on the monitor 4.

The segments 88 cut off into an arc-shape leaves more space in the distal end face of the distal rigid portion 5 than conventional circular objective lenses, making it possible to bring placement location of components, the four LEDs 27 in this case, contained in the distal rigid portion 5 close to the first lens 51. This in turn makes it possible to reduce outside diameter of the distal rigid portion 5 of the endoscope 2.

The invention described above with reference to the embodiments are not limited to the illustrated embodiments and variations thereof, and various modifications can be made in the implementation stage without departing from the spirit and scope of the present invention. Furthermore, the embodiments described above contain inventions in various phases, and various inventions can be extracted by appropriately combining multiple components disclosed herein.

For example, any of the embodiments from which some of the components are removed also constitutes an invention as long as the presented problems can be solved and the cited advantages are available.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A manufacturing method for an image pickup unit which includes:
   a circuit board,
   a solid-state image pickup device disposed on a back side of the circuit board such that a light receiving unit arranged to the solid-state image pickup device faces forward,
   an objective lens which has a plurality of legs extending toward the solid-state image pickup device, and
   a lens barrel which holds the objective lens and has a flat tapered surface formed on at least a part of a proximal end of the lens barrel, the proximal end of the lens barrel being spaced with a predetermined distance from a front part of the solid-state image pickup device and the circuit board and opposing the front part of the solid-state image pickup device and the circuit board without contact, so that a distance between the flat tapered surface and the circuit board increases toward the outer circumference of the lens barrel, the manufacturing method comprising the steps of:
   applying a first light-curing adhesive to an end face of each of the plurality of legs of the objective lens which opposes the solid-state image pickup device;
   mounting the objective lens together with the lens barrel by abutting the end face of each of the plurality of legs of the objective lens against the solid-state image pickup device;
   directing a first beam at the end face of each of the plurality of legs in a direction along the tapered surface to cure the first light-curing adhesive so that the first beam is passed through the space between the front part of the solid-state image pickup device and the circuit board and the proximal end of the lens barrel, and
   after the directing of the first beam is complete, applying a second light-curing adhesive between the circuit board and the proximal end of the lens barrel, and directing a second beam to cure the second light-curing adhesive therebetween from an outer circumferential side of the lens barrel.

2. The manufacturing method according to claim 1, wherein the circuit board has a hole formed therein, and the manufacturing method includes disposing the solid-state image pickup device on the back side of the circuit board such that the light receiving unit is exposed through the hole formed in the circuit board.

3. The manufacturing method according to claim 1, further including forming the flat tapered surface so that a plane including the flat tapered surface and a plane including the circuit board in a state where the objective lens and the lens barrel are mounted against the solid-state image pickup device intersect at a predetermined angle $\theta$.

4. The manufacturing method according to claim 3, further including directing the first beam in the direction along the tapered surface at the predetermined angle $\theta$, wherein $\theta$ is set at a value such that the first beam irradiates the end face of each of the plurality of legs of the objective lens.

* * * * *